(12) United States Patent
Hwang et al.

(10) Patent No.: US 10,016,794 B2
(45) Date of Patent: Jul. 10, 2018

(54) MULTI-INJECTION STEAM TYPE REACTOR AND ORGANIC WASTE PROCESSING APPARATUS INCLUDING SAME

(71) Applicant: BOO-KANG TECH CO., LTD., Seoul (KR)

(72) Inventors: Dong-Gyun Hwang, Anyang-si (KR); Ho-Jae Hwang, Seoul (KR); Young-Soo Choi, Seoul (KR); Chang-Soo Kim, Suwon-si (KR)

(73) Assignee: BOO-KANG TECH CO., LTD., Seoul (KR)

( * ) Notice: Subject to any disclaimer, the term of this patent is extended or adjusted under 35 U.S.C. 154(b) by 298 days.

(21) Appl. No.: 14/900,193

(22) PCT Filed: Dec. 17, 2013

(86) PCT No.: PCT/KR2013/011701
§ 371 (c)(1),
(2) Date: Dec. 21, 2015

(87) PCT Pub. No.: WO2015/002361
PCT Pub. Date: Jan. 8, 2015

(65) Prior Publication Data
US 2016/0151812 A1    Jun. 2, 2016

(30) Foreign Application Priority Data
Jul. 2, 2013 (KR) .................. 10-2013-0077183

(51) Int. Cl.
*C02F 11/18* (2006.01)
*B09B 3/00* (2006.01)
(Continued)

(52) U.S. Cl.
CPC ............ *B09B 3/0091* (2013.01); *C02F 11/18* (2013.01); *C02F 11/04* (2013.01); *C02F 2103/20* (2013.01);
(Continued)

(58) Field of Classification Search
CPC ............... B09B 3/0091; C02F 11/18
(Continued)

(56) References Cited

U.S. PATENT DOCUMENTS 3,454,492 A * 7/1969 Gaines .................. B01J 49/75
  210/140
3,525,439 A * 8/1970 Spragins ............ B01D 21/2416
  210/520

(Continued)

FOREIGN PATENT DOCUMENTS

JP  3102722 U    4/2004
KR  2001-0074579 A  8/2001
(Continued)

OTHER PUBLICATIONS

International Search Report in corresponding PCT application PCT/KR2013/011701 dated Feb. 5, 2014, 2 pp. in English and 2 pp. in Korean.

*Primary Examiner* — Huy Tram Nguyen
(74) *Attorney, Agent, or Firm* — Juan Carlos A. Marquez; Marquez IP Law Office, PLLC

(57) ABSTRACT

A reactor for processing organic waste includes a steam supply pipe installed in a reaction vessel such that steam supplied from an external steam supply device can be supplied into the inside of the reaction vessel. The steam supply pipe has a plurality of steam supply holes so as to supply the steam supplied from the steam supply device to the waste in the reaction vessel through the holes. An organic waste processing apparatus comprising the reactor having
(Continued)

the configuration above is provided. Heat due to the steam supplied to the reactor is uniformly supplied to the waste in the reactor within a short time, and thereby increasing processing efficiency.

2 Claims, 8 Drawing Sheets

(51) Int. Cl.
  *C02F 103/20* (2006.01)
  *C02F 103/22* (2006.01)
  *C02F 11/04* (2006.01)
(52) U.S. Cl.
  CPC .... *C02F 2103/22* (2013.01); *C02F 2201/002* (2013.01); *C02F 2303/06* (2013.01)
(58) Field of Classification Search
  USPC ......................................................... 422/183
  See application file for complete search history.

(56) References Cited

U.S. PATENT DOCUMENTS

| | | | | | |
|---|---|---|---|---|---|
| 4,578,954 | A | * | 4/1986 | Lenhardt | F28B 3/06 60/646 |
| 5,089,228 | A | * | 2/1992 | Meijer | A61L 11/00 241/17 |
| 7,523,603 | B2 | * | 4/2009 | Hagen | F01K 21/047 422/607 |
| 2009/0221865 | A1 | * | 9/2009 | Renaud | B01D 53/85 588/319 |
| 2009/0314700 | A1 | * | 12/2009 | Mabuchi | B01F 7/024 210/187 |

FOREIGN PATENT DOCUMENTS

| | | |
|---|---|---|
| KR | 2010-0028618 A | 3/2010 |
| KR | 2011-0039835 A | 4/2011 |

\* cited by examiner

MULTI-INJECTION STEAM TYPE REACTOR AND ORGANIC WASTE PROCESSING APPARATUS INCLUDING SAME

TECHNICAL FIELD

The present invention relates to a reactor using multi-injection of steam and an organic waste processing apparatus employing the same, and more particularly to an apparatus which can maximizing a waste processing effect through a process (at a high temperature: 150~220° C. and a high pressure: 3.7~22 bar) capable of efficiently decomposing organic waste.

BACKGROUND ART

An organic waste processing apparatus for processing organic waste (moisture content of 80~90%) produced in disposal of sewage/waste water sludge, food garbage, waste, livestock excretions, animal carcasses, etc. includes a waste tank (Sludge Hopper) in which a certain amount of organic waste to be processed is put, a reactor for decomposing the stored waste at high temperature, a gas-liquid separator for separating the decomposed waste into gas and liquid, and a dehydrator (Filter Press) for dehydrating the liquefied reaction-product waste containing a certain amount of solid.

The reactor has to keep a temperature appropriate to a reaction for decomposition, as a device that decomposes organic waste by applying water and heat thereto. To this end, the reactor generally includes a reaction vessel, a steam supply device to keep the appropriate temperature by supplying steam to the reaction vessel, and a stirrer to stir the organic waste in the reaction vessel to uniformly transfer heat of the supplied steam to the organic waste.

However, a conventional reactor has a problem of lowering a processing efficiency since heat supplied to the reaction vessel is not uniformly transferred to the waste to be processed. That is, in a conventional method, heat is primarily transferred from the steam to only an upper portion of the waste put in the reaction vessel since an external steam supply pipe is connected to an upper side of the reaction vessel and supplies steam to the upper portion in the reaction vessel, and therefore the stirrer is needed to stir the waste so that the supplied steam can be spread throughout the waste. However, it takes time to uniformly transfer heat from the steam to the waste even though the stirrer operates, and thus there is a problem of decreasing efficiency of the reaction.

DISCLOSURE

Technical Problem

The present invention is conceived to solve the foregoing problems, and an aspect of the present invention is to uniformly transfer heat from steam supplied to the reactor to waste in a reaction vessel in a short time, thereby increasing a processing efficiency.

Technical Solution

In accordance with an embodiment of the present invention, a reactor for processing organic waste includes a steam supply pipe provided inside a reaction vessel so that steam can be supplied from an external steam supply device to the reaction vessel, the steam supply pipe being formed with a plurality of steam supply holes through which the steam from the steam supply device is supplied to waste in the reaction vessel.

The steam supply pipe includes a first steam supply pipe vertically arranged in the reaction vessel, a second steam supply pipe horizontally extended from the first steam supply pipe, and a third steam supply pipe radially provided in a shaft of a stirrer vertically installed in the reaction vessel, The first steam supply pipe is arranged at an inner wall side of the reaction vessel, the second steam supply pipe is extended toward a center portion of the reaction vessel, the shaft of the stirrer is shaped like a pipe to receive steam from the steam supply device and supply the received steam to the third steam supply pipe, and the holes of the steam supply pipe are opened upward and downward.

In accordance with another embodiment of the present invention, there is provided an organic waste processing apparatus having the foregoing reactor.

Advantageous Effects

According to an exemplary embodiment, heat is uniformly transfer from steam supplied to the reactor to waste in a reaction vessel in a short time, thereby improving a processing efficiency.

DESCRIPTION OF DRAWINGS

FIG. 3 and FIG. 4 illustrate a second embodiment of the reactor according to the present invention, in which FIG. 3 is viewed from a lateral side and FIG. 4 is viewed from a top side.

BEST MODE

Below, exemplary embodiments of the present invention will be described in detail with reference to accompanying drawings.

As described above, an organic waste processing apparatus includes a waste tank, a reactor, a gas-liquid separator, and a dehydrator. The present invention proposes a structure where a reactor to be employed for the organic waste processing apparatus is improved in a processing efficiency.

Figure 1:
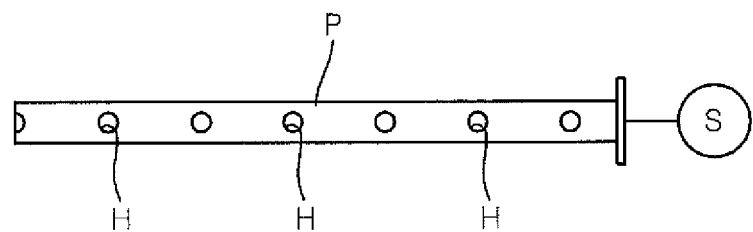
FIG. 1 illustrates a structure of a steam supply pipe used in a reactor according to the present invention.

FIG. 1 is a view showing a structure of a steam supply pipe used in a reactor according to the present invention. A steam supply pipe P according to the present invention has a structure that a general pipe is perforated to have a plurality of steam supply holes H. The holes H are formed at regular intervals along a lengthwise direction of the pipe. Further, the holes H may be arranged in a row or a plurality of rows, or arranged irregularly or at irregular intervals. The steam supply pipe P is installed inside the reaction vessel of the reactor, and has one end connected to a steam supply device S. As steam is supplied from the steam supply device S to the steam supply pipe P, steam is discharged through the holes H and then supplied to the reaction vessel of the reactor.

By the way, a term "steam" typically refers to a state that water is heated and evaporated, but in the following embodiments also refers to a state that air itself is heated, i.e. heated air. Thus, the steam supplied by the steam supply device S involves hot air as well as water vapor.

Figure 2:
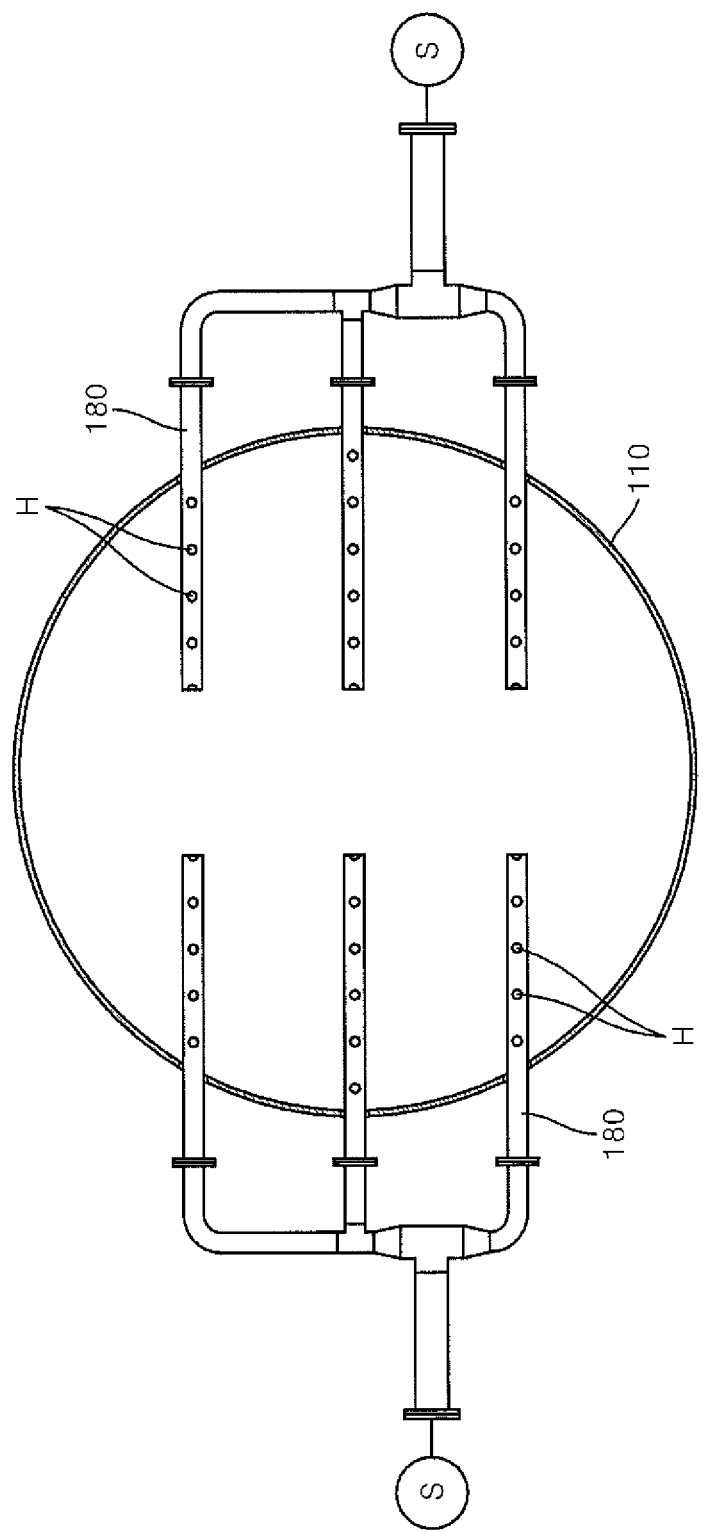
FIG. 2 illustrates a first embodiment of the reactor according to the present invention.

FIG. 2 illustrates a first embodiment of the reactor according to the present invention, and shows a plan view of when the steam supply pipe P is applied to the reactor.

As shown in FIG. 2, the reactor includes a reaction vessel 110, and a steam supply pipe 180 is branched from an external steam supply device S into a plurality of pipes the reaction vessel 110 and extended toward the inside of the reaction vessel 110. In the reaction vessel 110, the steam supply pipe 180 is arranged in such a manner that the plurality of pipes are arranged in parallel with one another in a horizontal direction. The holes H of the steam supply pipe 180 are formed in a region of the steam supply pipe 180, which corresponds to the inside of the reaction vessel 110. Therefore, the steam supplied by the steam supply device S is supplied into the reaction vessel 110 via the holes H.

With this structure, steam is supplied into organic waste in the state that the reaction vessel 110 of the reactor is filled with the organic waste. At this time, heat is transferred by multi-injection of steam, i.e. as the steam is injected at a plurality of points where the holes H are formed. Therefore, heat is uniformly transferred throughout the organic waste, thereby improving a reaction efficiency.

Further, in the foregoing structure, the steam supply pipe 180 is placed at a lower side of the reaction vessel 110. Since heat of the supplied steam is generally transferred upward, it is possible to increase an effect on transferring heat by placing the steam supply pipe 180 at a lower side of the reaction vessel 110.

A reaction in the reactor is as follows. Low-pressure waste put into the reaction vessel 110 is uniformly and quickly heated as steam of high temperature (150~220° C.) and high pressure (3.7~22 bar) is supplied by the steam supply pipe 180, and is then airtightly maintained for about 10~90 minutes at a pressure higher than a steam pressure curve to keep a liquid state thereof inside the reaction vessel 110 under the conditions of high temperature (150~220° C.) and high pressure (3.7~22 bar). Accordingly, waste is decomposed.

Figure 3:
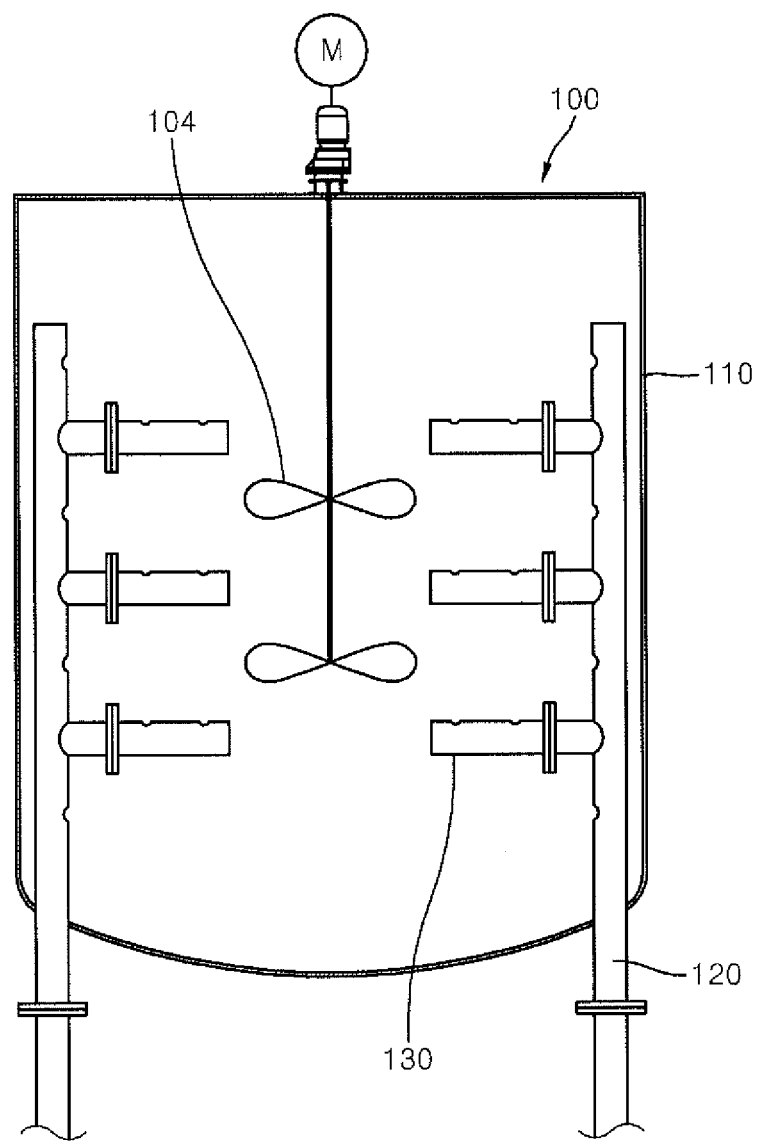
Figure 4:
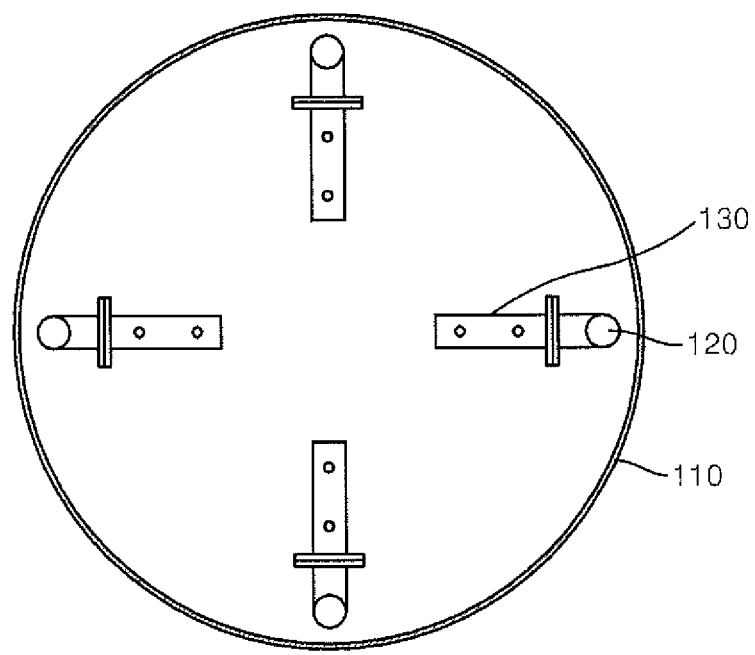

FIG. 3 and FIG. 4 illustrate a second embodiment of the reactor according to the present invention, in which FIG. 3 is viewed from a lateral side and FIG. 4 is viewed from a top side.

In this embodiment, the steam supply pipe includes first steam supply pipes 120 vertically arranged in the reaction vessel 110, and second supply pipes 130 horizontally extended from the first steam supply pipe 120 and arranged at regular intervals. The first steam supply pipe 120 is arranged adjacent to an inner wall of the reaction vessel 110 and is formed with holes facing an inside of the reaction vessel 110, thereby supplying steam toward the inside of the reaction vessel 110. The second steam supply pipe 130 is extended from the first steam supply pipe 130 toward an inner center portion of the reaction vessel 110 and is formed with holes facing upward so that the steam can be supplied upward inside the reaction vessel 110. The steam is supplied from the external steam supply device S to the second steam supply pipe 130 via the first steam supply pipe 120. At this time, the first steam supply pipe 120 supplies the steam toward the center portion of the reaction vessel, and the second steam supply pipe 130 supplies the steam upward.

With this structure, the steam is supplied to all parts inside the reaction vessel 110, thereby having an effect on uniformly supplying the steam throughout the organic waste inside the reaction vessel 110. While the steam is supplied as above, a stirrer 104 provided in the reaction vessel 110 stirs both the organic waste in the reaction vessel 110 and the supplied steam, thereby helping a reaction.

Figure 5:
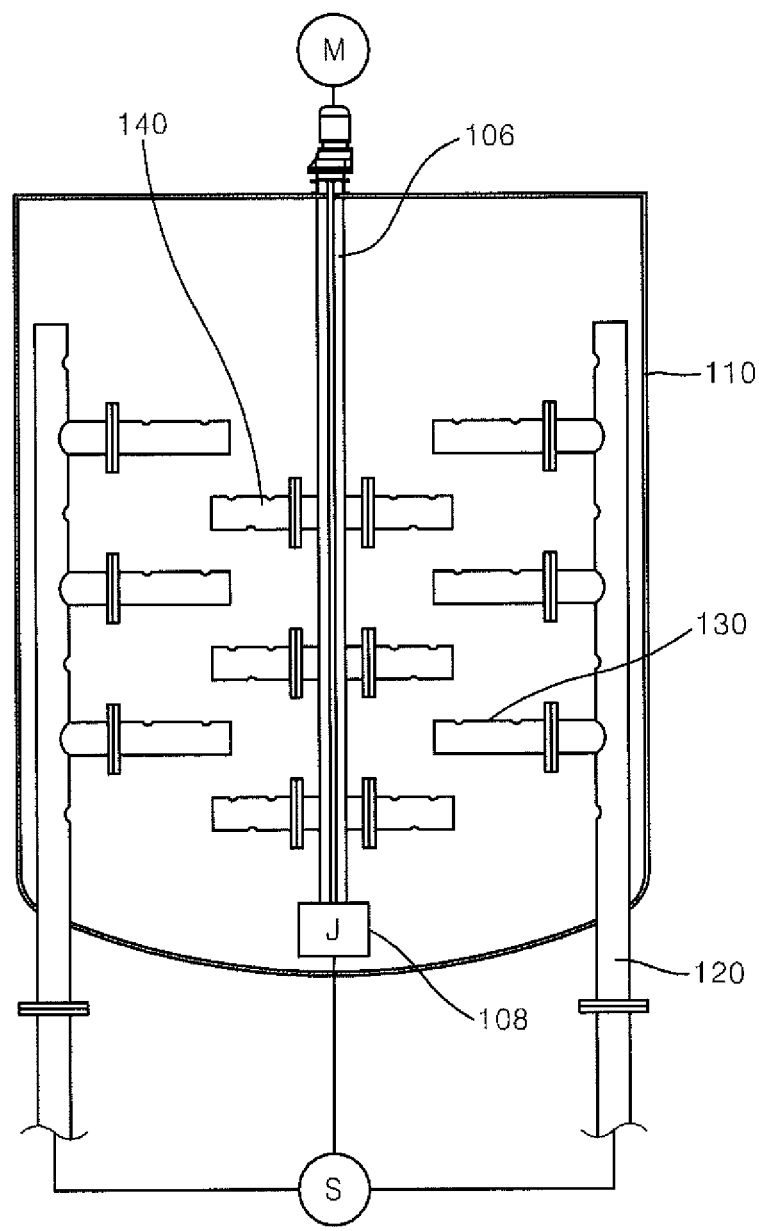
FIG. 5 illustrates a third embodiment of the reactor according to the present invention.

FIG. 5 illustrates a third embodiment of the reactor according to the present invention. FIG. 5 shows an example that a third steam supply pipe 140 is provided in a shaft 106 of the stirrer in addition to the structure shown in FIGS. 3 and 4.

That is, the shaft 106 of the stirrer is shaped like a pipe, and third steam supply pipes 140 are radially provided in the shaft 106. Steam is supplied from the external steam supply device S to the inside of the shaft 106 shaped like a pipe, and the steam supplied to the shaft 106 is then supplied to the third steam supply pipes 140. The steam supplied to the third steam supply pipe 104 is supplied to the inside of the reaction vessel 110 via holes formed on the third steam supply pipe 140. The holes of the third steam supply pipe 140 are opened upward and downward, so that the steam can be discharged upward and downward from the third steam supply pipe 140.

With this structure, a motor M rotates the shaft 106, so that the third steam supply pipe 140 can supply the steam while rotating around the shaft 106. Therefore, it is possible to uniformly supply the steam to more parts through the third steam supply pipe 140. Since the organic waste is stirred while the third steam supply pipe 140 rotates, the third steam supply pipe 140 also functions as the stirrer. Therefore, the third steam supply pipes 140 are used as the stirring wings of the stirrer.

By the way, the pipe extended from the external steam supply device 180 and the shaft 106 of the stirrer are connected by a rotary joint J. Although the pipe receiving the steam from the steam supply device 180 is not rotatable but immovable, the shaft 106 of the stirrer may be rotatably connected to the steam supply device 180.

Figure 6:
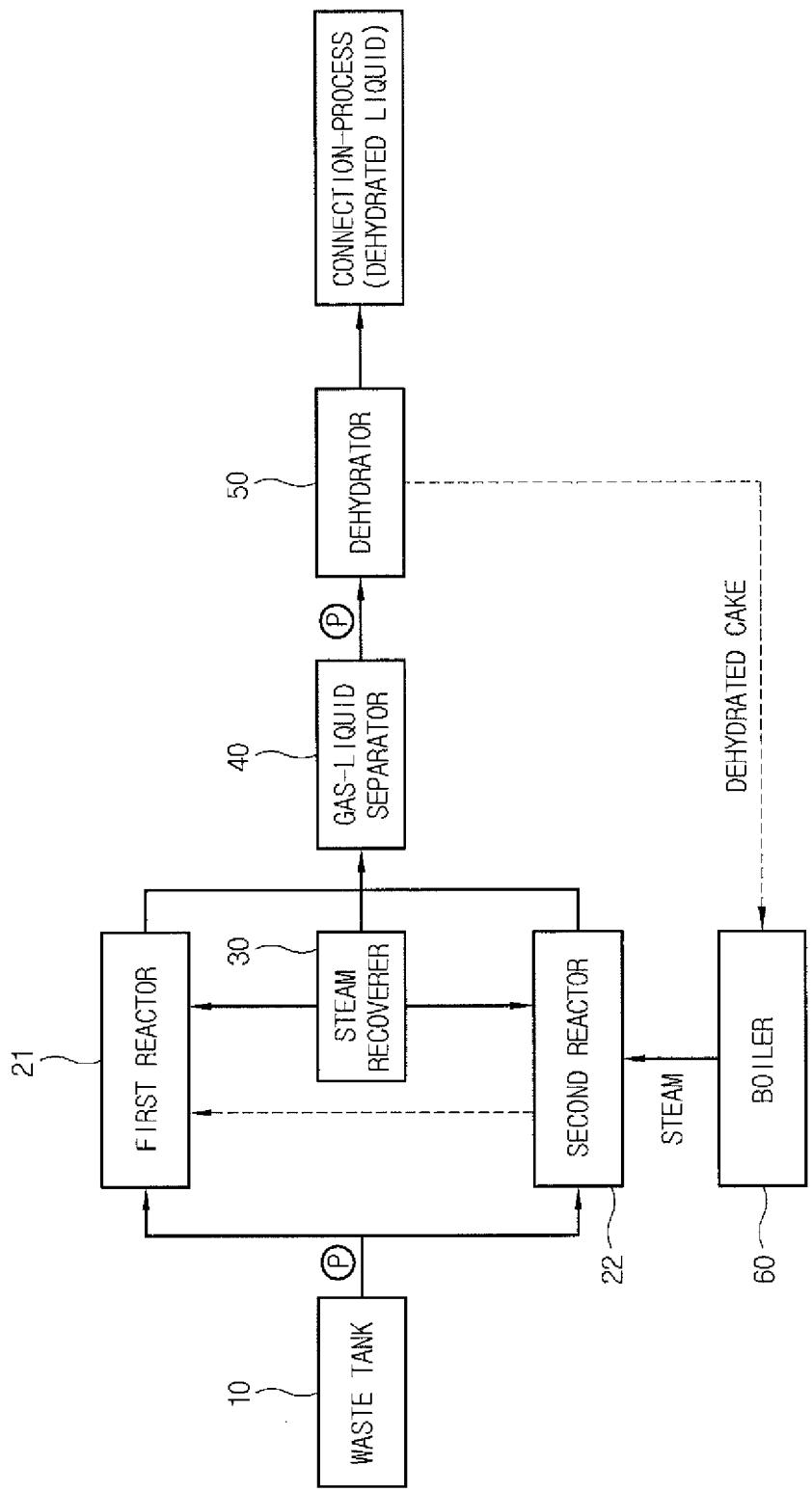
FIG. 6 illustrates an organic waste processing apparatus to which the reactor according to the foregoing embodiments of the present invention is applied.

FIG. 6 illustrates an organic waste processing apparatus to which the reactor according to the foregoing embodiments of the present invention is applied.

In this embodiment, the organic waste processing apparatus includes a waste tank 10, a first reactor 21, a second reactor 22, a steam recoverer 30, a gas-liquid separator 40, a dehydrator 50, and a boiler 60.

In the waste tank 10, a certain amount of organic waste to be processed is put. The waste stored in the waste tank 10 is fed to first and second reactors 21 and 22 by a feeding pump. The first and second reactors 21 and 22 decompose the fed waste, and the decomposed waste is separated into gas and liquid by the gas-liquid separator 40. The liquefied reaction-product waste containing a certain amount of solid is dehydrated by the dehydrator 50. The dehydrated cake discharged from the dehydrator 50 is supplied to the boiler 60 and recycled as fuel for the boiler. The dehydrated liquid is discharged from the dehydrator 50 and connection-processed.

By the way, two reactors 21 and 22 are shown in the embodiment of FIG. 6. The boiler 60 corresponds to an element described as the steam supply device S in the embodiments shown in FIG. 1 to FIG. 5, and therefore steam generated in the boiler 60 is used for decomposition reaction in the reactors 21 and 22.

At this time, steam of the boiler 60 is supplied to the second reactor 22, so that steam of the second reactor 22 can be supplied as preheating steam to the first reactor 21. That is, residual steam after decomposition in the second reactor 22 is recovered by the steam recoverer 30 and supplied to the first reactor 21, thereby preheating the waste in the first reactor 21. Thus, energy needed for heating the waste is minimized by preheating the waste in the first reactor 21. In this structure, the steam recoverer 30 serves as the steam supply device S for the first reactor 21.

In addition, pressure of the steam remaining in the first and second reactors 21 and 22 is used for supplying reaction-product waste to the gas-liquid separator (Flash Tank). After the reactions are completed in the reactors 21 and 22, a valve installed in a lower portion of the reaction vessel 110 is gradually opened so that the reaction-product waste can be supplied to the gas-liquid separator 40 by the pressure of steam in the reaction vessel 110.

Thus, the waste processing apparatus with such dual reactors 21 and 22 can operate continuously and use the minimum energy in increasing temperature through steam recovery. That is, one reactor 22 first starts a reaction and waste is put into the reactor 21 having the same size as the reactor 22 during the reaction. After the reaction is completed in the reactor 22, the steam in the reactor 22 is sent to the reactor 21 to preheats the waste, thereby having an effect on increasing efficiency of utilizing energy due to steam recovery. In addition, the steam intermittently discharged for controlling the pressure and temperature of the reactor 22 is also sent to the reactor 21 and preheats the waste thereby having an effect on increasing efficiency of utilizing energy due to steam recovery.

According to the present invention, the organic waste processing apparatus is advantageously improved a processing efficiency through multi-injection of steam for uniformly supplying the steam to the reactor.

Figure 7:
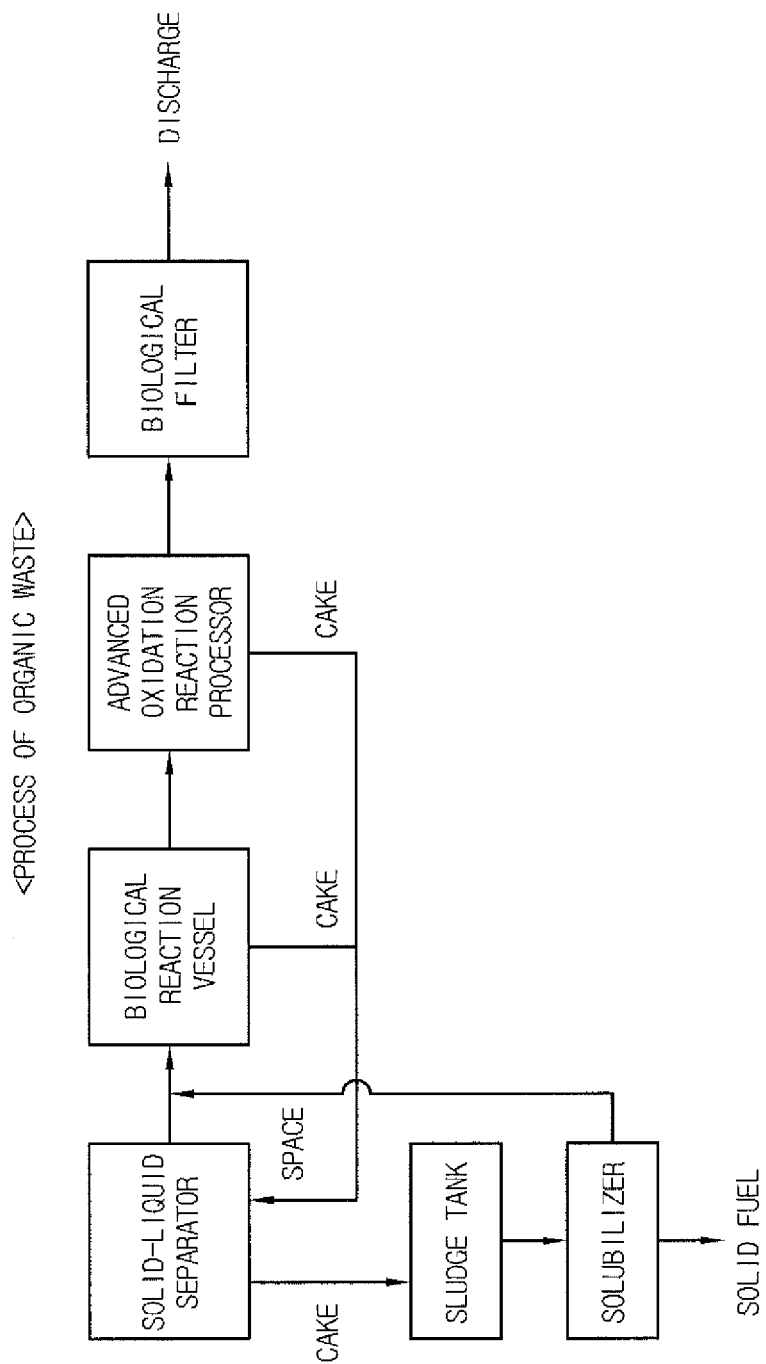
FIG. 7 illustrates another embodiment of the organic waste processing apparatus.

FIG. 7 illustrates another embodiment of the organic waste processing apparatus to which the reactor according to the present invention is applied.

In this embodiment, the organic waste processing apparatus includes a solid-liquid separator, a biological reaction vessel, an advanced oxidation processor, a biological filter, a sludge tank, and a solubilizer. The solid-liquid separator is a device for separating waste water into solid and liquid, and a biological reaction vessel is a reaction vessel for removing contaminants such as an organic matter, nitrogen, phosphorus, etc. from the waste water by high-concentration microorganism. The advanced oxidation separator is a device for processing non-biodegradable organics not previously processed in the biological reaction vessel and chromaticity by coagulation and ozone oxidation. The biological filter is a device for processing organic matters obtained by substituting the non-biodegradable organics with biodegradable organics after the advanced oxidation separation using high-concentration microorganism attached to filtering media, and processing residual nitrogen and floating material. The sludge tank 10 is a tank in which a certain amount of organic waste to be processed is put. The solubilizer is a reactor using multi-injection of steam according to the foregoing embodiments shown in FIG. 1 to FIG. 5.

With this structure, the organic waste put into the sludge tank is supplied to the solubilizer and decomposed by the multi-injection of steam. The waste decomposed in the solubilizer is supplied to the biological reaction vessel so that contaminants such as an organic matter, nitrogen, phosphorus, etc. can be removed from the waste by the high-concentration microorganism, and then non-biodegradable organics and chromaticity are discharged after they are processed by coagulation and ozone oxidation in the advanced oxidation separator and undergo the advanced oxidation-separation or the like in the biological filter. At this time, the processes are repeated in such a manner that the cakes discharged from the biological reaction vessel and the advanced oxidation separator are returned to the solid-liquid separator, and the cake discharged from the solid-liquid separator is returned to the sludge tank. The products discharged from the solubilizer may be used as solid fuel.

This embodiment gives an example of the processes for processing the organic waste, and the organic waste processing method employs the reactor using multi-injection of steam as the solubilizer, thereby increasing decomposition efficiency.

Figure 8:
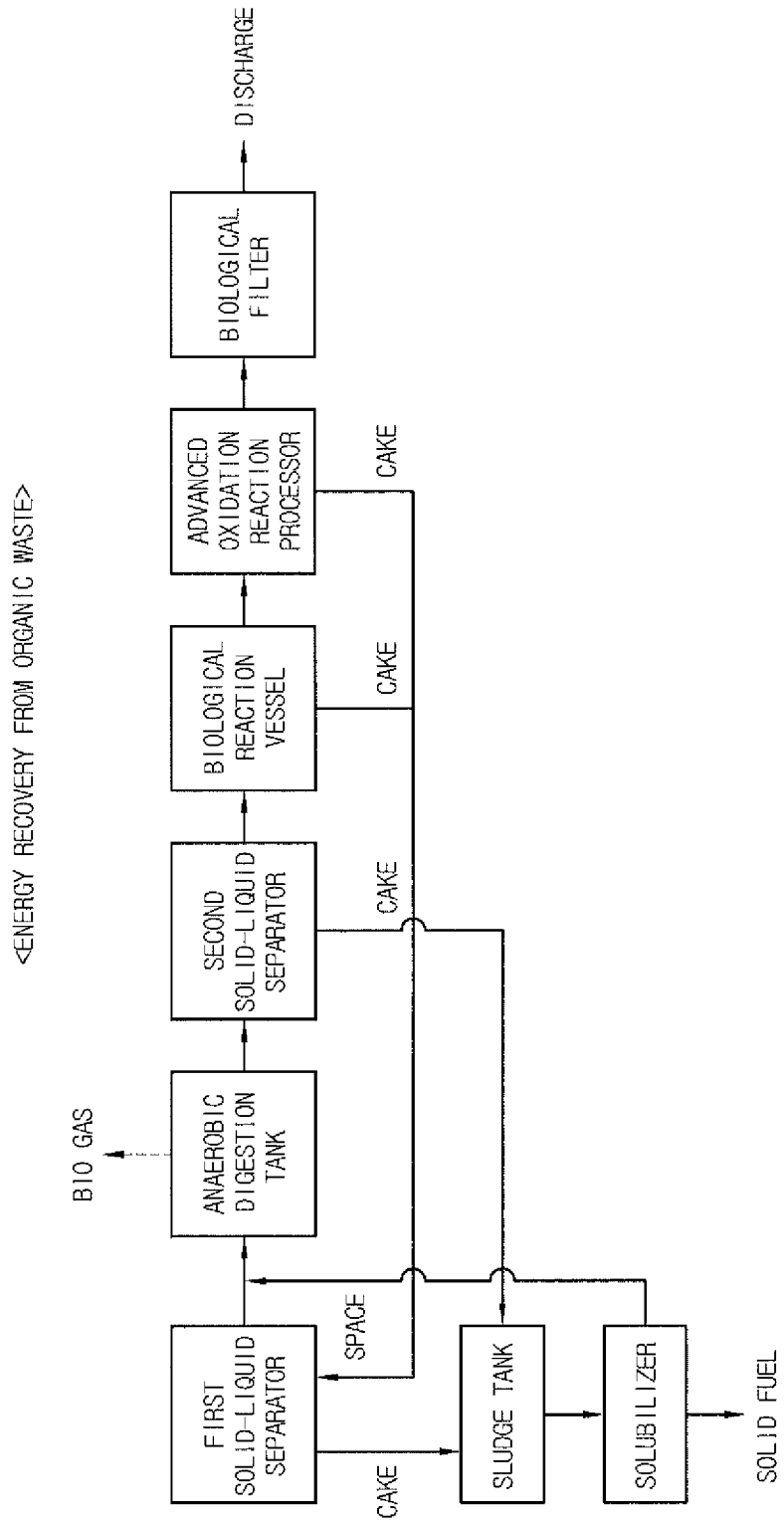
FIG. 8 illustrates still another embodiment of the organic waste processing apparatus.

FIG. 8 illustrates still another embodiment of the organic waste processing apparatus to which the reactor according to the present invention is applied.

In this embodiment, the organic waste processing apparatus includes a first solid-liquid separator, an anaerobic digestion tank, a second solid-liquid separator, a biological reaction vessel, an advanced oxidation reaction processor, the biological filter, a sludge tank, and a solubilizer. This embodiment is the same as the foregoing embodiment shown in FIG. 7 except that that the solid-liquid separator includes the first solid-liquid separator and the second solid-liquid separator, and the anaerobic digestion tank between the two solid-liquid separators.

The anaerobic digestion tank is a device for generating bio gas while removing organic matters from waste water by anaerobes under anaerobic condition.

Cakes discharged from the biological reaction vessel and the advanced oxidation separator are supplied to the first solid-liquid separator, and the cakes discharged from the two solid-liquid separators are all supplied to the sludge tank.

Like the foregoing embodiment shown in FIG. 7, this embodiment processes the organic waste and at the same time generates bio gas through the anaerobic digestion tank arranged between the two solid-liquid separators, i.e., performs not only disposal of the organic waste but also energy recovery from the waste. Even in these processed, the reactor using multi-injection of steam is used as the solubilizer, thereby improving efficiency of not only processing but also energy recovery.

INDUSTRIAL APPLICABILITY

According to the present invention, heat is uniformly transfer from steam supplied to the reactor to waste in a reaction vessel in a short time, thereby improving a processing efficiency. Accordingly, the reactor and the organic waste processing apparatus employing the same are improved in a processing efficiency.

The invention claimed is:
1. A reactor for processing organic waste, the reactor comprising
  a steam supply pipe provided inside a reaction vessel so that steam can be supplied from an external steam supply device to the reaction vessel,
  the steam supply pipe being formed with a plurality of steam supply holes through which the steam from the steam supply device is supplied to waste in the reaction vessel,
  the steam supply pipe comprising:
  a first steam supply pipe vertically arranged in the reaction vessel, a second steam supply pipe horizontally extended from the first steam supply pipe, and a third steam supply pipe radially provided in a shaft of a stirrer vertically installed in the reaction vessel, the first steam supply pipe being arranged at an inner wall side of the reaction vessel, the second steam supply pipe being extended toward a center portion of the reaction vessel, the shaft of the stirrer being shaped like a pipe to receive steam from the steam supply device and supply the received steam to the third steam supply pipe, and the holes of the steam supply pipe being opened at least one of upward, downward, and sideway.

2. An organic waste processing apparatus comprising the reactor according to claim 1.

\* \* \* \* \*